(12) United States Patent
McFarland et al.

(10) Patent No.: US 7,002,947 B1
(45) Date of Patent: Feb. 21, 2006

(54) METHOD AND SYSTEM FOR DATA COLLISION AVOIDANCE IN A WIRELESS COMMUNICATIONS SYSTEM

(75) Inventors: Robert G. McFarland, Cedar Rapids, IA (US); Stephen E. Enke, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 936 days.

(21) Appl. No.: 10/027,216

(22) Filed: Dec. 21, 2001

(51) Int. Cl.
*H04B 7/212* (2006.01)

(52) U.S. Cl. ..................................... 370/348; 370/407

(58) Field of Classification Search ................ 370/348, 370/407, 222, 457, 350, 329; 455/13.4
See application file for complete search history.

(56) References Cited

U.S. PATENT DOCUMENTS

| 4,506,360 A | * | 3/1985 | Kryskow et al. | ........... 370/457 |
| 4,665,518 A | * | 5/1987 | Champlin et al. | ........... 370/222 |
| 5,621,895 A | * | 4/1997 | Weis et al. | ................. 370/407 |

OTHER PUBLICATIONS

Co-pending patent application Docket No. 02CR026/KE entitled "Resume Message Protocol For A Wireless Communications System" filed on an even date, inventor R. McFarland et al.

* cited by examiner

*Primary Examiner*—Chi Pham
*Assistant Examiner*—Prenell Jones
(74) *Attorney, Agent, or Firm*—Nathan O. Jensen; Kyle Eppele

(57) ABSTRACT

A method of transmitting data over a single-channel wireless network having a plurality of nodes is disclosed. According to the method, a first link is established between two of the nodes and data is transmitted therebetween. A break in transmission between the two nodes is listened for, and a first predetermined time interval is waited if a break in transmission between two nodes occurs. A second predetermined time interval is established if the first predetermined time interval lapses with no detected transmission over the channel. The second predetermined time interval is divided into a plurality of slots, and each node randomly selects one of the slots. One of the nodes establishes a second link if that node has selected a slot earlier in time than slots selected by the remainder of the nodes.

20 Claims, 8 Drawing Sheets

| NODES | P | | | | |
|---|---|---|---|---|---|
| | 0.9 | 0.8 | 0.7 | 0.6 | 0.5 |
| 2 | 11 | 5 | 4 | 3 | 3 |
| 3 | 15 | 8 | 5 | 4 | 4 |
| 4 | 20 | 10 | 7 | 5 | 5 |
| 5 | 25 | 12 | 8 | 6 | 6 |
| 6 | 30 | 15 | 10 | 7 | 7 |
| 7 | 34 | 17 | 11 | 8 | 8 |
| 8 | 39 | 19 | 13 | 9 | 9 |
| 9 | 44 | 22 | 14 | 10 | 10 |
| 10 | 49 | 24 | 16 | 11 | 11 |
| 11 | 54 | 26 | 17 | 12 | 12 |
| 12 | 59 | 29 | 18 | 13 | 13 |
| 13 | 63 | 31 | 20 | 14 | 14 |
| 14 | 68 | 33 | 21 | 15 | 15 |
| 15 | 73 | 36 | 23 | 17 | 16 |
| 16 | 78 | 38 | 24 | 18 | 17 |

METHOD AND SYSTEM FOR DATA COLLISION AVOIDANCE IN A WIRELESS COMMUNICATIONS SYSTEM

CROSS-REFERENCE TO RELATED APPLICATIONS

This application is related to co-pending U.S. patent application Ser. No. 10/027,444 entitled "Resume Message Protocol For A Wireless Communications System," invented by Robert G. McFarland, Justin C. Thomas, and Stephen E. Enke, said application being filed concurrently herewith and incorporated by reference herein in its entirety.

FIELD OF THE INVENTION

The invention relates to communications, and more particularly, to a method and apparatus for minimizing or avoiding the simultaneous transmission of data by multiple data sources over a single-channel, wireless communications system.

BACKGROUND OF THE INVENTION

Single-channel wireless communications networks are relatively simple to operate and provide an efficient method for a finite number of participants to exchange data. A common network structure is to permit one participant, or node, to establish a link over the channel to communicate with another participant, or node. Several data packets, separated by brief breaks, may be exchanged between the two nodes until one of the nodes sends a packet including the command to terminate the link. Another node may then attempt to establish another link. This arrangement is currently being used to communicate STANAG 5066 data over a single-channel wireless HF network.

The sequential arrangement of establishing links between nodes is satisfactory when none of the nodes in the wireless network are sending a high volume of information, or if there are few nodes in the network. With the addition of a higher volume of information and/or a increased number of nodes, it is likely that multiple nodes will wish to establish links at the same time. It may be difficult to determine which node should establish the next link over the channel when the previous link is terminated.

Another problem encountered in known wireless networks is the timing of the attempts by non-linked nodes to establish new links. Nodes in known wireless networks are configured to attempt to establish a new link over the channel as soon as no activity on the channel is detected. However, as explained above, each link includes non-terminating breaks between data packets. An attempt by a node to establish a new link based on the non-terminating breaks included in the current link causes multiple nodes to transmit data simultaneously. This situation, known as a collision of data, causes data loss in the current link and continuously frustrates nodes that are attempting to establish a link over the channel.

It is therefore an object of the invention to provide a method for coordinating establishment of data links over a single-channel wireless network.

It is another object of the invention to prevent the collision of data over a wireless network.

It is still another object of the invention to allow for the inclusion of nodes in a wireless network that may not possess the necessary means to be subject to any coordination measures imposed on the other nodes in the network.

A feature of the invention is the reduced occurrence of data collision.

Another feature of the invention is the ordered determination of the establishment of data links over the channel.

An advantage of the invention is the reduced occurrence of data collision.

Another advantage of the invention is the establishment of data links in an orderly fashion.

SUMMARY OF THE INVENTION

The invention provides a method of transmitting data over a single-channel wireless network having a plurality of nodes. According to the invention, a first link is established between two of the nodes and data is transmitted therebetween. A break in transmission between the two nodes is listened for, and a first predetermined time interval is waited if a break in transmission between two nodes occurs. A second predetermined time interval is established if the first predetermined time interval lapses with no detected transmission over the channel. The second predetermined time interval is divided into a plurality of slots, and each node randomly selects one of the slots. One of the nodes establishes a second link if that node has selected a slot earlier in time than slots selected by the remainder of the nodes.

The invention also provides a single-channel, wireless network. The network includes a plurality of nodes capable of receiving and transmitting data across the network A single link between two of the plurality of nodes can be established at any time. Each link includes a plurality of sequential data packets separated by non-terminating breaks in transmission. Each node includes a listening structure that substantially continuously monitors communications on the channel and initiates a contention interval when no communication has been detected on the channel for a first predetermined time. The contention interval is divided into a predetermined number of slots. A selection structure randomly selects one of the predetermined number of slots. The node that has selected a slot that is earlier in time than slots selected by other nodes is permitted to establish a link.

The invention further provides a method of avoiding the simultaneous transmission of data from a plurality of data sources over a single wireless channel, wherein each data source is operationally connected to a means for wireless communication over the network. The method includes: establishing a first wireless link between first and second data sources selected from the plurality of data sources and transmitting data therebetween; listening, via the wireless communication means, for a break in transmission between the first and second data sources; waiting for a first predetermined time interval if a break in transmission between the first and second data sources occurs; establishing a second predetermined time interval if the first predetermined time interval lapses with no detected transmission over the channel; dividing the second predetermined time interval into a plurality of slots, wherein each data source randomly selects one of the slots, wherein the wireless communication means operationally connected to one of the plurality of data sources establishes a second link if said one of the plurality of data sources has selected a slot earlier in time than slots selected by the remainder of the data sources.

The invention further provides a method of transmitting data over a single-channel wireless multi-node network. A first link is established between first and second nodes selected from the plurality of nodes, and data is transmitted therebetween. A link termination message is listened for, and a predetermined time interval is established when the link termination message is detected. The predetermined time interval is divided into a plurality of slots, wherein each node randomly selects one of the slots. One of the nodes establishes a second link if that node has selected a slot earlier in time than slots selected by the remainder of the nodes.

BRIEF DESCRIPTION OF THE DRAWINGS

FIG. 6 is a chart used to determine the number of slots to be established in the contention interval of FIG. 4.

FIG. 7 is a detailed diagram of a contention interval according to another embodiment of the invention.

FIG. 8 is a detailed diagram of a contention interval according to yet another embodiment of the invention.

FIG. 9 is a detailed diagram of a contention interval according to still another embodiment of the invention.

DETAILED DESCRIPTION OF THE DRAWINGS

Figure 1:
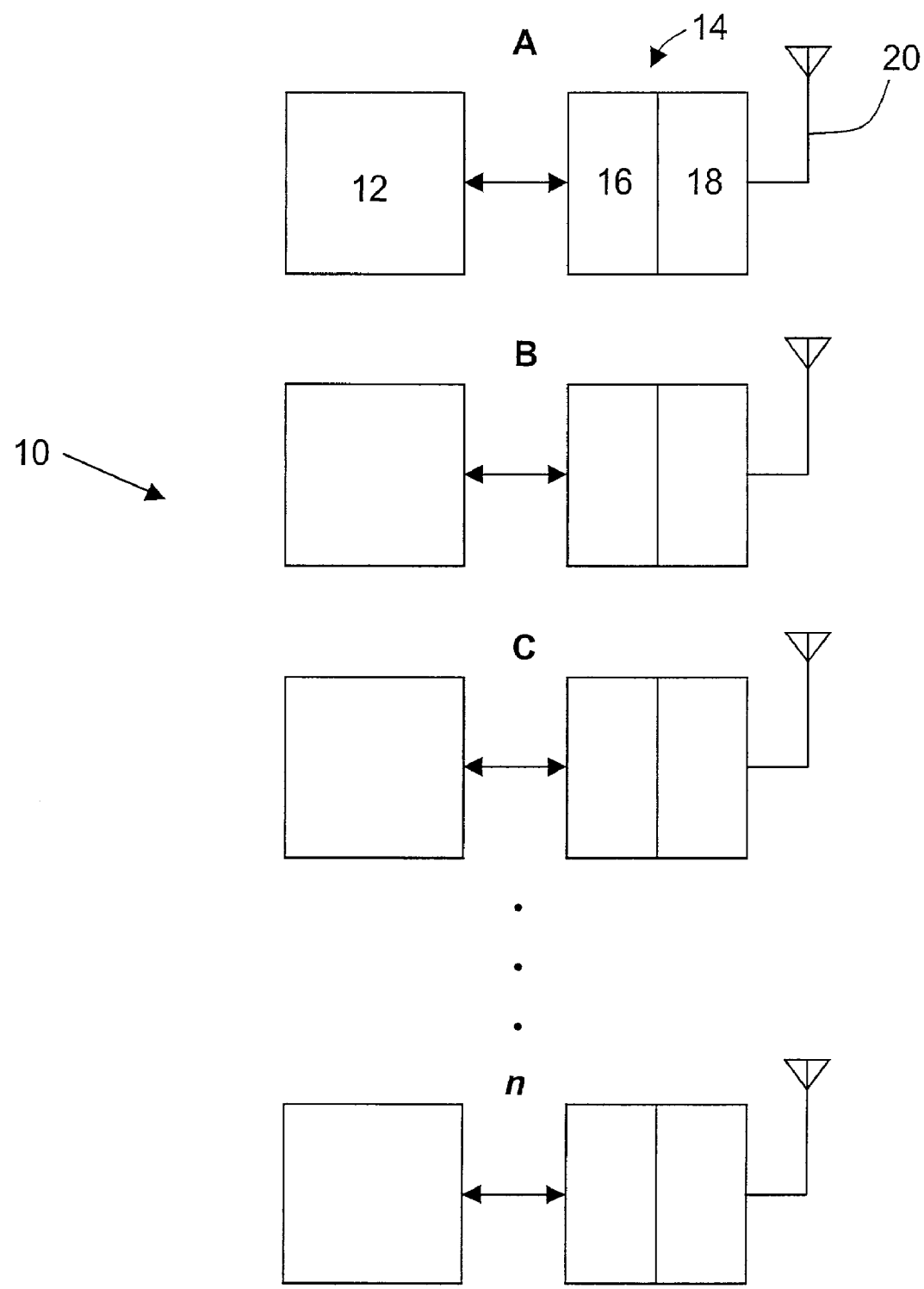
FIG. 1 is a schematic diagram showing a plurality of nodes in a wireless communications network.

Turning now to the drawings, in which like reference numbers designate like components, an embodiment of the invention is schematically shown in FIG. 1. A wireless communications network 10 includes a plurality of nodes, which are identified by the letters A, B, C, . . . n. Each node includes a computer 12, which may include a processor, memory, a display, and other components. Computer 12 also includes software that controls the transmission and reception of data, such as HF Messenger™, manufactured by Rockwell Collins, Inc. of Cedar Rapids, Iowa. Computer 12 may be considered a data source, or may be operationally connected to an external data source (not shown).

Figure 2:
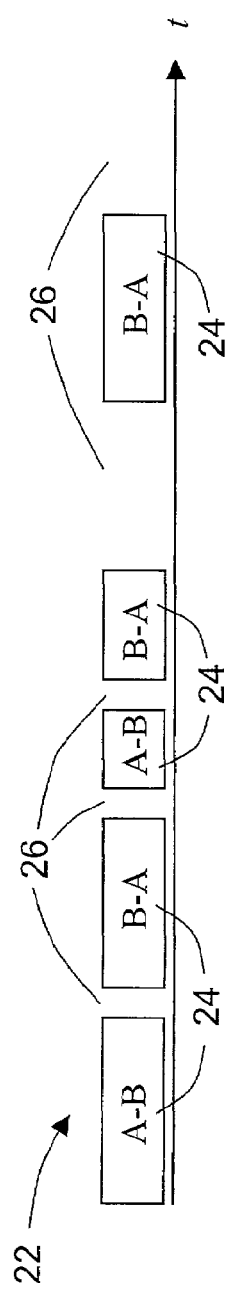
FIG. 2 is a timing diagram representing a communications link between two nodes in the wireless communications network of FIG. 1.

Computer 12 is connected to a wireless communications module 14, which includes a modem 16. Modem 16 converts data from computer 12 into a commonly accepted communications format and converts information in the communications format into a format useable by computer 12. The output of modem 16 is sent to a radio 18, which, through antenna 20, transmits and receives data over a wireless network. In the present invention, the radios in all nodes A, B, C, . . . n transmit over a single channel. A node, such as node A for example, attempts to establish a link with another node, such as node B, if it detects no data being transmitted over the channel. FIG. 2 schematically depicts a link 22 between node A and node B. Link 22 includes individual data packets 24 transmitted between the two nodes, with breaks 26 between the packets. Because nodes in known single-channel wireless communications networks will attempt to transmit data when any break 26 in link 22 is detected, link 22 is constantly interrupted, and a loss in data transmission integrity is encountered.

Figure 3:
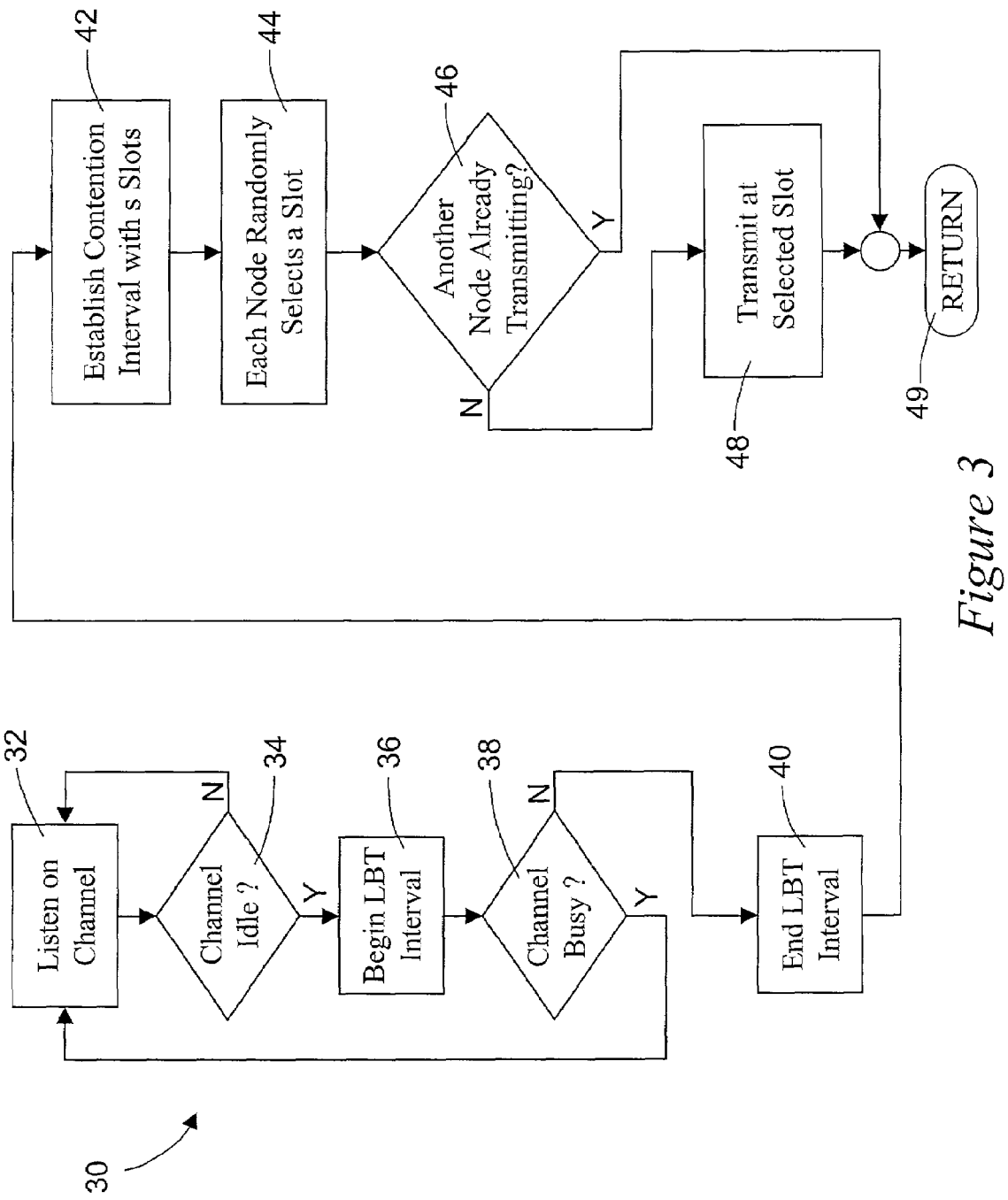
FIG. 3 is a flowchart showing a method of regulating access to a wireless communications channel according to the invention.

FIG. 3 depicts a method 30 for reducing interruptions in data links in a single-channel wireless network according to the invention. In step 32, each node is programmed to listen on the channel for any transmitting activity. In step 34, each node detects whether there is any activity on the channel. If there is activity on the channel, each node is programmed to return to step 32 and continue to listen. If the channel is idle, a predetermined interval is initiated in step 36. This predetermined interval is termed the Listen Before Transmitting (LBT) interval. The LBT interval is set to last longer than the longest break between packets in a link. If, in step 38, transmission activity is detected on the channel, the nodes are programmed to return to a listening state (step 32) after resetting the LBT interval to zero. If no transmission activity is detected on the channel for the duration of the LBT interval (step 40), it is safe to assume that the existing link has terminated. This process is graphically shown in FIG. 4, where successive LBT intervals are identified with reference numerals 50a–e. When a break 26 is detected between packets 24 in link 22, each node initiates LBT interval 50. However, when a successive packet 24 is detected, LBT interval 50 is reset, as shown by the dashed lines 52a–d on LBT intervals 50a–d, and each node continues to listen for another break. When LBT interval 50e expires at time 52e without activity being detected on the channel, it can then be assumed that link 22 has indeed terminated, and that it is safe for any node to attempt to establish another link.

Figure 4:
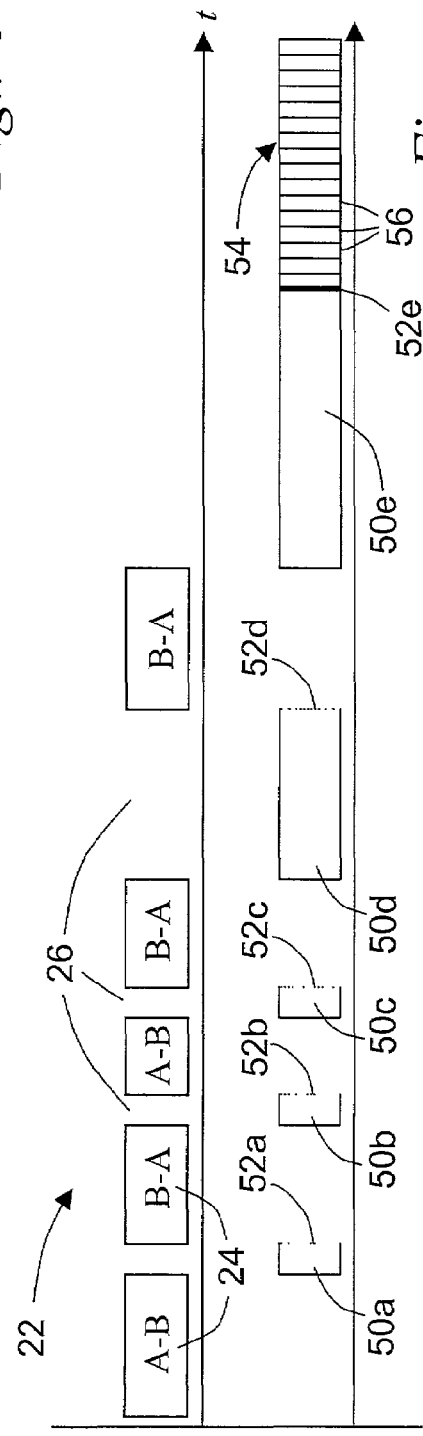
FIG. 4 is a timing diagram according to an embodiment of the invention.
Figure 5:
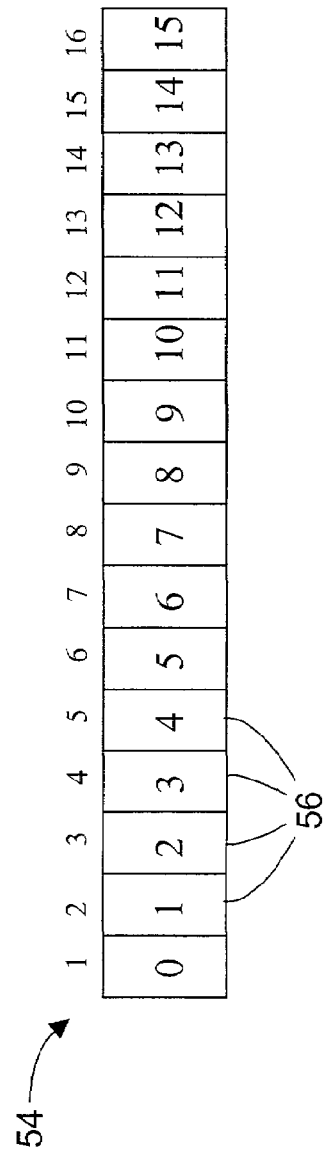
FIG. 5 is a detailed diagram of the contention interval shown in FIG. 3.

Returning to FIG. 3, at step 42 each node on the network initiates or establishes a contention interval 54 having a predetermined length. As shown in FIGS. 4 and 5, contention interval 54 is divided into a predetermined number of slots 56. In step 44 (FIG. 3), each node randomly selects one of the slots and waits until its selected slot to begin transmitting to establish a link. The node that has randomly selected the earliest slot has permission to transmit first (step 48), and all other nodes return to the beginning of the method (step 49). For example, if three nodes randomly select slots 3, 4, and 7 respectively (FIG. 5), the node that selected slot 3, which in this instance is the 'winning' slot because it is the first occurring selected slot, will begin establishing a link before the other two nodes are scheduled to do so, and those other nodes must again wait (according to method 30) until that link is terminated to again attempt to establish a link. By using method 30, the likelihood of conflicting transmissions on a single wireless channel is significantly reduced.

The invention may be arranged such that all nodes select a slot even if some of the nodes do not have a message to send. In such an arrangement, the node obtaining a winning slot and having a message to send will be the first to attempt to establish a link.

The number of slots 56 must be large enough to ensure a low probability of two or more nodes randomly selecting the same winning slot but not so large as to cause large delay times. It does not matter if two or more nodes choose the same non-winning slot because the node choosing the winning slot will always begin transmitting first. The following formula can be used to determine the number of slots (Equation 1):

$$P=[(n/(s^n))*(((s-1)^(n-1))+((s-2)^(n-1))+((s-3)^(n-1))+ \ldots +((1)^(n-1)))]$$

where P is the probability that one and only one node picks the winning slot, n is the number of nodes and s is the number of slots. FIG. 6 is a table that can be used as a guide to choosing the number of slots. As can be seen, if a high probability (such as 0.9) of a single winning slot is desired, a higher number of slots are required to be established. The more nodes that wish to establish a link over the channel, more slots are necessary. It has been found, in some experiments, that setting the number of slots 56 to sixteen is acceptable.

The duration of each slot must be set so that a transmission that starts at the beginning of a slot can be detected at all nodes before the beginning of the next slot. If substantial interference is anticipated to be encountered on the channel, or if encryption schemes must be employed to detect a signal on the channel, the slot duration must be adjusted accordingly. Under said circumstances, a slot duration of 6 seconds has been found to be adequate.

Figures 7, 8, 9:
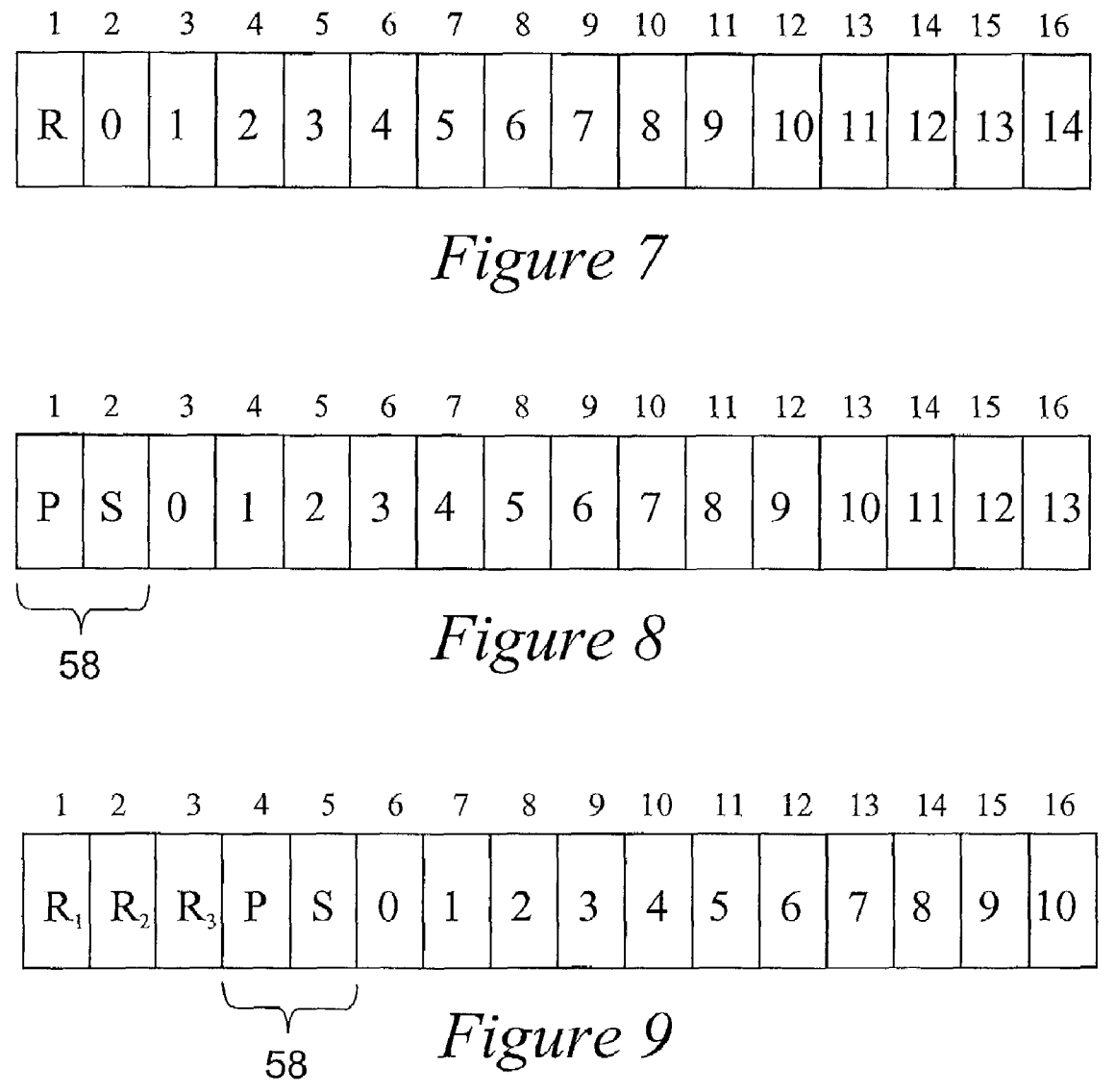

There may be circumstances in which all nodes that are able to participate in the network are not known in advance. As shown in FIG. 7, a reserved slot R may be reserved for such a node. Slot R is not available to the other nodes during the random slot selection process. When a contention interval begins, the node assigned to reserved slot R will begin transmitting during the first slot. The slots randomly selected by the remaining nodes are "bumped back" to accommodate reserved slot R. The inclusion of one or more reserved slots permits systems that are not programmed to participate in the random slot selection process to still participate in the wireless network.

FIG. 8 shows the inclusion of priority slots 58, which may include a primary slot P and a secondary slot S. Primary slot P may be defined and used if a node in the network (a primary node) should take precedence over other nodes. Establishing primary slot P for the primary node ensures that communications from the primary node will be transmitted at the beginning of the contention interval prior to communications from other nodes. Secondary slot S may also be established if it is desired to have communications from a specific node take precedence over communications from all other nodes (except the primary node). Additional priority slots may be included as desired. FIG. 9 schematically depicts a contention interval in which three reserved slots R1, R2, R3 as well as primary and secondary slots P, S are established. Nodes that are not defined as corresponding to the reserved slots or the primary or secondary slots compete for the sixth through the sixteenth slots and are allowed to establish a link only if the channel is clear during the first five slots.

Figure 10:
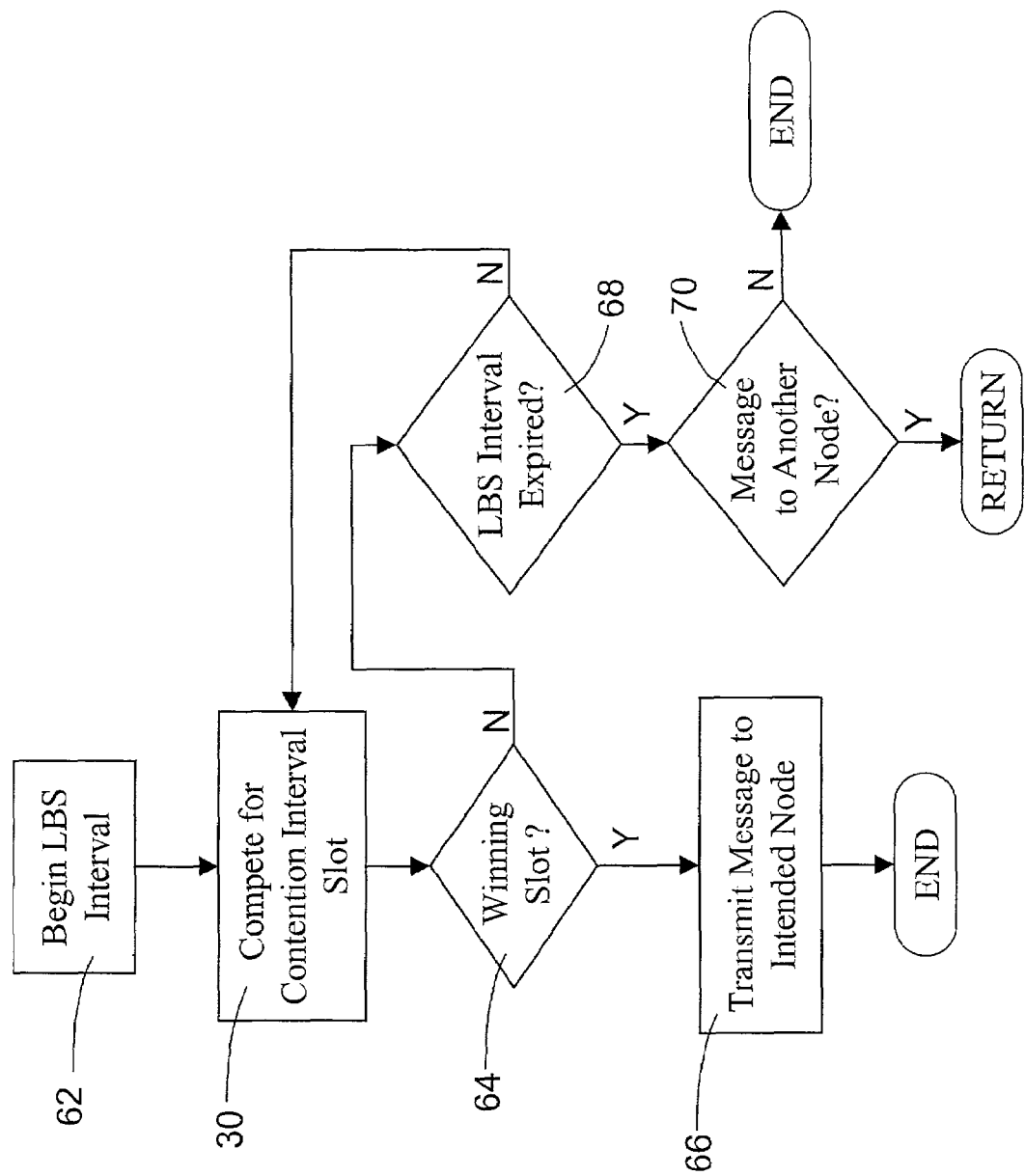
FIG. 10 is a flowchart showing a method usable by a node in the communications network of FIG. 1 according to the invention.

Because only two nodes at a time can use the channel, it is possible that a data source using a node may wait for an undesirable amount of time to successfully obtain a winning slot so that it can communicate with a desired node. FIG. 10 shows a method 60 that may be used to redirect the communications of a data source if its node has not obtained a winning slot. In step 62, a predetermined time interval, termed a Listen Before Send (LBS) interval, may be defined based on the needs of the data source. The data source, through a first node, competes for a contention interval slot according to method 30 shown in FIG. 2. If the first node obtains a winning slot (step 64) prior to the expiration of the LBS interval, then in step 66 the first node establishes a communications link over the channel to communicate with the desired node (a second node). If the first node does not obtain a winning slot and the LBS interval has not yet expired (step 68) the first node continues to compete for a winning contention interval slot according to step 30. If the LBS interval expires before a winning contention interval slot is obtained, it is then determined in step 70 whether the data source needs to communicate with a node other than the second node. If so, the method returns to step 62 and the node attempts to communicate with the node other than the second node.

If the LBS interval is set to a large value, the data source will wait until it wins a contention interval and then send its data. If the LBS interval is set to a small value (or to zero), the data source will attempt to send data to a different node if the channel is busy. In many instances, the channel will still be busy. It is possible that the data source may find that it is currently linked with and receiving data from the node to which it now desires to send data, and under these circumstances would be allowed to do so. The value of the LBS interval set for each node depends on the type of data traffic expected at that node. If a node normally uses one destination node for all send and receive messages, then the LBS interval should be set to a very large value. On the other hand, if a node normally sends and receives data from many different destination nodes, then the LBS interval should be set to a relatively small value to increase the probability of (1) connecting with a node to which it was already linked, and (2) delivering data to desired nodes.

Figure 11:
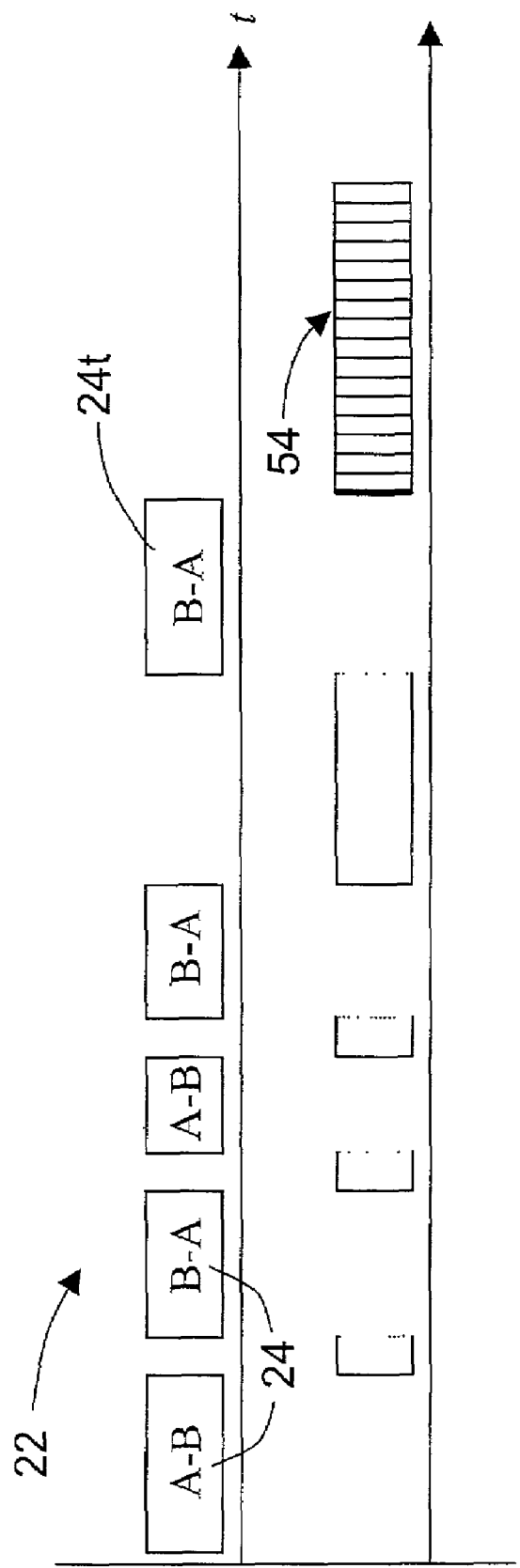
FIG. 11 is a timing diagram according to another embodiment of the invention.
Figure 12:
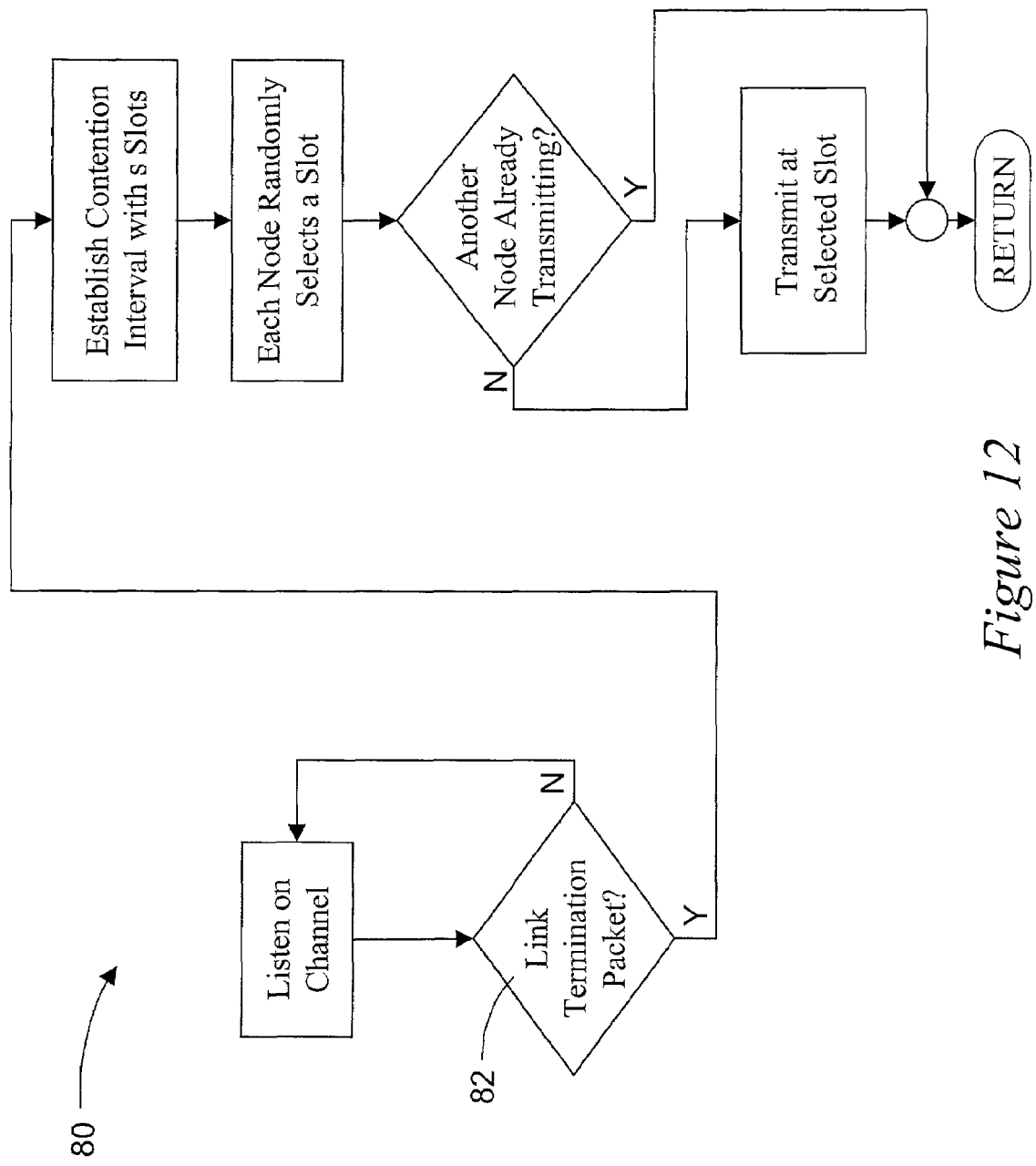
FIG. 12 is a flowchart showing a method according to another embodiment of the invention.

The invention may be varied in other ways while keeping with the spirit of the invention. For example, it may be possible to identify the last packet in a link as it is transmitted across the network. Such a packet is shown at 24t in FIG. 11 and may be termed a link termination packet. If link termination packet 24t is detected, all nodes on the network may safely assume that there will be no more packets 24 in link 22, and a contention interval 54 may be initiated by the nodes as soon as the link termination packet is no longer detected. This variation of the invention does not initiate an LBT interval after the end of link termination packet 24t. It is further possible to vary the invention by eliminating the use of LBT intervals, and relying instead on the detection of a link termination packet to signal the end of a link. Such a method is shown at 80 in FIG. 12. It can be seen that step 82, in which nodes detect a link termination packet, replaces steps 34, 36, 38 and 40 of the embodiment of the invention shown in FIG. 3.

An advantage of the invention is that many nodes may use a single wireless communications channel in an orderly fashion.

Another advantage is that an established link between two nodes is not interrupted by other nodes attempting to transmit information.

Still another advantage is that nodes not programmed to participate in the random slot selection may still, through the use of reserved slots, participate in the wireless network.

Yet another advantage is that the invention may be used to provide an equal chance for every participating node to obtain a winning slot. However, the invention is flexible enough to include priority slots, if desired, to ensure that certain nodes will given a first chance to communicate over the channel.

Still another advantage is that nodes may be programmed to attempt to communicate with other nodes, through the use of the LBS interval.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of transmitting data over a single-channel wireless network, the network including a plurality of nodes, the method comprising:

establishing a first link between first and second nodes selected from the plurality of nodes and transmitting data therebetween;

listening for a break in transmission between the first and second nodes;

waiting for a first predetermined time interval if a break in transmission between the first and second nodes occurs;

establishing a second predetermined time interval if the first predetermined time interval lapses with no detected transmission over the channel;

dividing the second predetermined time interval into a plurality of slots, wherein each node randomly selects one of the slots;

wherein one of the plurality of nodes establishes a second link if said one of the plurality of nodes has selected a slot earlier in time than slots selected by the remainder of the nodes.

2. The method of claim 1, further comprising reserving a slot for a first predetermined node.

3. The method of claim 2, wherein the slot reserved for the first predetermined node is the first slot in the second predetermined time interval.

4. The method of claim 2, wherein the slot reserved for the first predetermined node is a first reserved slot, and further comprising reserving a second reserved slot for a second predetermined node.

5. The method of claim 1, further comprising designating at least one of the nodes as priority nodes, and reserving a slot for each of the priority nodes.

6. The method of claim 1, wherein the first predetermined time interval is selected to be longer than any non-terminating break during transmission of the first link.

7. The method of claim 1, wherein one of the plurality of nodes is configured to attempt to establish a link another of the plurality of nodes through the listening, waiting, establishing and dividing steps for a third predetermined time, and wherein the one of the plurality of nodes cancels said attempt if unsuccessful in establishing the link at the end of the third predetermined time.

8. A method of avoiding the simultaneous transmission of data from a plurality of data sources over a single wireless channel, wherein each data source is operationally connected to a means for wireless communication over the network, comprising:

establishing a first wireless link between first and second data sources selected from the plurality of data sources and transmitting data therebetween;

listening, via the wireless communication means, for a break in transmission between the first and second data sources;

waiting for a first predetermined time interval if the break in transmission between the first and second data sources;

establishing a second predetermined time interval if the first predetermined time interval lapses with no detected transmission over the channel;

dividing the second predetermined time interval into a plurality of slots, wherein each data source randomly selects one of the slots;

wherein the wireless communication means operationally connected to one of the plurality of data sources establishes a second link if said one of the plurality of data sources has selected a slot earlier in time than slots selected by the remainder of the data sources.

9. The method of claim 8, wherein one of the plurality of data sources is configured to attempt to establish, via the wireless communication means operationally connected to it, a link another of the plurality of data sources through the listening, waiting, establishing and dividing steps for a third predetermined time, and wherein the one of the plurality of data sources cancels said attempt if unsuccessful in establishing the link at the end of the third predetermined time.

10. A single-channel, wireless network, comprising:

a plurality of nodes capable of receiving and transmitting data across the network, wherein a single link between two of the plurality of nodes can be established at any time, each link including a plurality of sequential data packets separated by non-terminating breaks in transmission, each node including a listening structure that substantially continuously monitors communications on the channel and initiates a contention interval when no communication has been detected on the channel for a first predetermined time, wherein the contention interval is divided into a predetermined number of slots, and a selection structure that randomly selects one of the predetermined number of slots, wherein the node that has selected a slot that is earlier in time than slots selected by other nodes is permitted to establish a link.

11. The network of claim 10, wherein the first predetermined time is longer than any of the non-terminating breaks in transmission included in the link.

12. The network of claim 10, wherein the node that has selected a slot that is earlier in time than slots selected by other nodes establishes a link if said node has data to transmit to one of the other nodes.

13. The network of claim 10, further including a node priority feature that assigns a first one of the slots to a predetermined node.

14. The network of claim 13, wherein the first one of the slots is prior in time to the other of the slots.

15. The network of claim 13, wherein the predetermined node to which the first one of the slots is assigned is a first predetermined node, and wherein the node priority feature assigns a second one of the slots to a second predetermined node.

16. A method of transmitting data over a single-channel wireless network, the network including a plurality of nodes, the method comprising:
- establishing a first link between first and second nodes selected from the plurality of nodes and transmitting data therebetween;
- listening for a link termination message;
- establishing a predetermined time interval upon detection of the link termination message;
- dividing the predetermined time interval into a plurality of slots, wherein each node randomly selects one of the slots;
- wherein one of the plurality of nodes establishes a second link if said one of the plurality of nodes has selected a slot earlier in time than slots selected by the remainder of the nodes.

17. The method of claim 16, further comprising reserving a slot for a first predetermined node.

18. The method of claim 17, wherein the slot reserved for the first predetermined node is the first slot in the predetermined time interval.

19. The method of claim 17, wherein the slot reserved for the first predetermined node is a first reserved slot, and further comprising reserving a second reserved slot for a second predetermined node.

20. The method of claim 16, further comprising designating at least one of the nodes as priority nodes, and reserving a slot for each of the priority nodes.

* * * * *